United States Patent
Zhang et al.

(10) Patent No.: US 7,719,593 B2
(45) Date of Patent: May 18, 2010

(54) VARIABLE FRAME RATE IMAGING

(75) Inventors: Ting Zhang, Tokyo (JP); Hiroki Otsuki, Tokyo (JP)

(73) Assignee: Sony Corporation (JP)

( * ) Notice: Subject to any disclaimer, the term of this patent is extended or adjusted under 35 U.S.C. 154(b) by 866 days.

(21) Appl. No.: 11/414,836

(22) Filed: May 1, 2006

(65) Prior Publication Data

US 2006/0262195 A1 Nov. 23, 2006

(30) Foreign Application Priority Data

May 23, 2005 (JP) ............................. 2005-148949

(51) Int. Cl.
H04N 5/335 (2006.01)
H04N 11/04 (2006.01)
H04N 7/12 (2006.01)
H04N 5/91 (2006.01)
H04N 5/00 (2006.01)

(52) U.S. Cl. .............. 348/312; 348/434.1; 348/439.1; 386/68; 386/129

(58) Field of Classification Search ........ 348/312, 348/434.1, 439.1; 386/68, 129
See application file for complete search history.

(56) References Cited

U.S. PATENT DOCUMENTS

| | | | |
|---|---|---|---|
| 6,919,876 B1 * | 7/2005 | Kawaguchi et al. | 345/103 |
| 2002/0021364 A1 * | 2/2002 | Asada et al. | 348/312 |
| 2003/0030740 A1 * | 2/2003 | Tsujino | 348/333.01 |
| 2003/0062479 A1 * | 4/2003 | Kametani et al. | 250/310 |
| 2006/0050601 A1 * | 3/2006 | Koo | 365/233 |

FOREIGN PATENT DOCUMENTS

| | | | |
|---|---|---|---|
| JP | 1-194684 A | 8/1989 |
| JP | 7-298212 A | 11/1995 |
| JP | 8-251492 A | 9/1996 |
| JP | 9-186964 A | 7/1997 |
| JP | 2000-165750 A | 6/2000 |
| JP | 2002-010129 A | 1/2002 |
| JP | 2004-153710 A | 5/2004 |

* cited by examiner

Primary Examiner—Nhan Tran
Assistant Examiner—Mekonnen Dagnew
(74) Attorney, Agent, or Firm—Lerner, David, Littenberg, Krumholz & Mentlik, LLP

(57) ABSTRACT

An image processing apparatus for processing an image signal, including: an operation processing section performing an operation according to a detected value of the image signal; a latch signal generation section for generating a plurality of latch signals, which indicate a timing of processing for the operation processing section and are based on a plurality of different picture rates applied to the image signal; a latch signal selection section selecting one of the plurality of latch signals inputted from the latch signal generation section and outputting the selected latch signal to the operation processing section; and a latch signal selection indication section indicating to the latch signal selection section a latch signal to be selected from the plurality of latch signals.

10 Claims, 8 Drawing Sheets

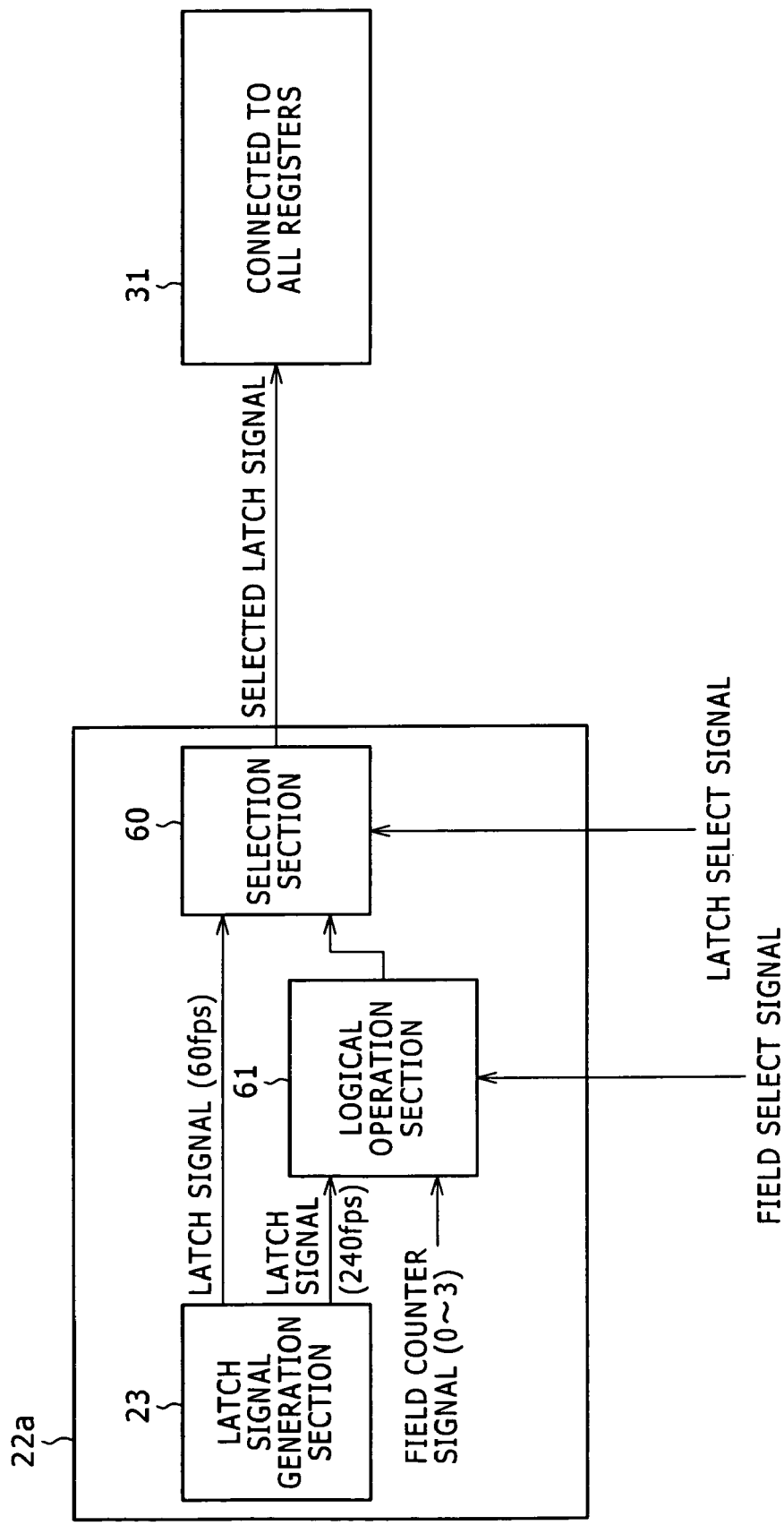

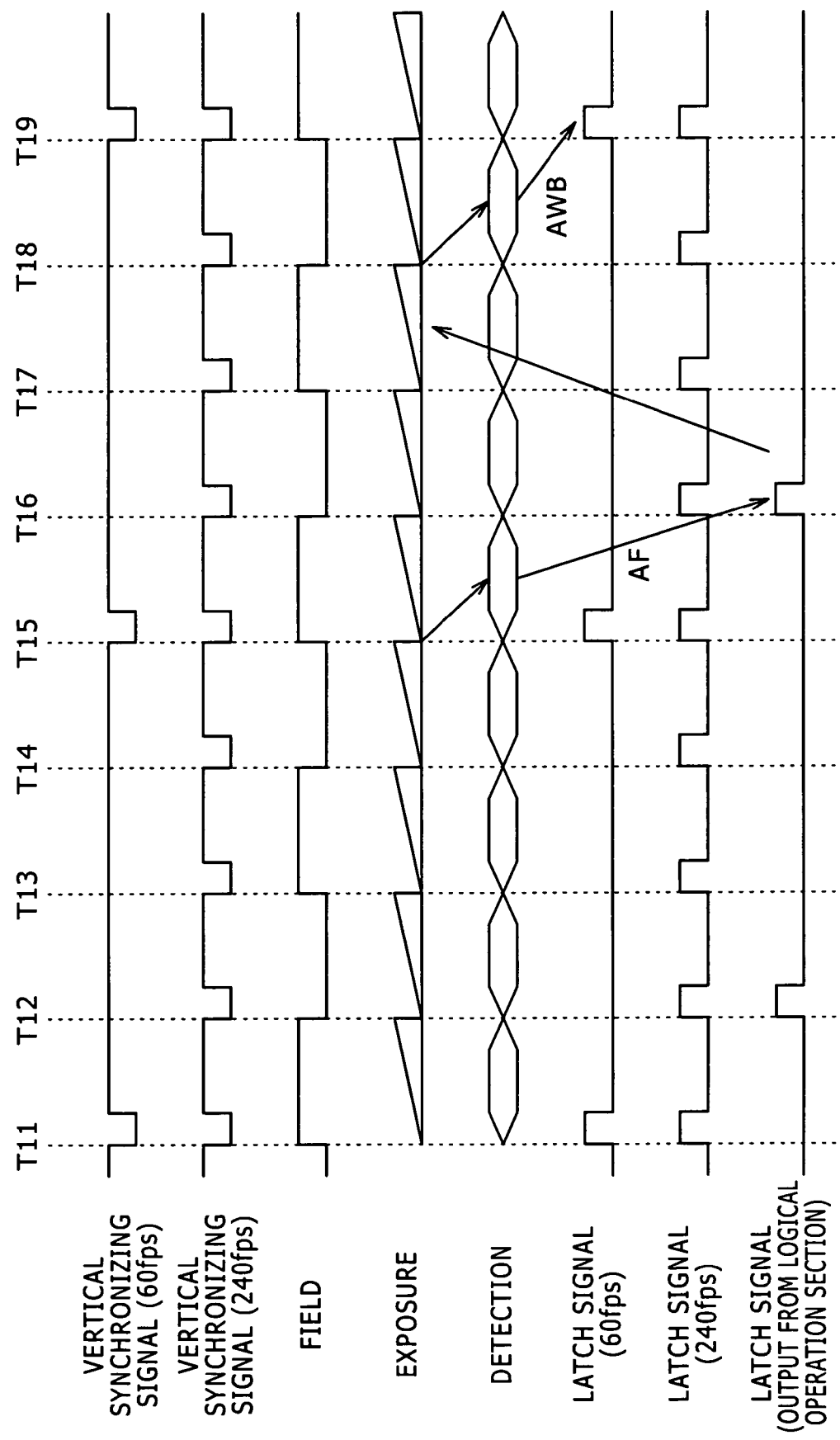

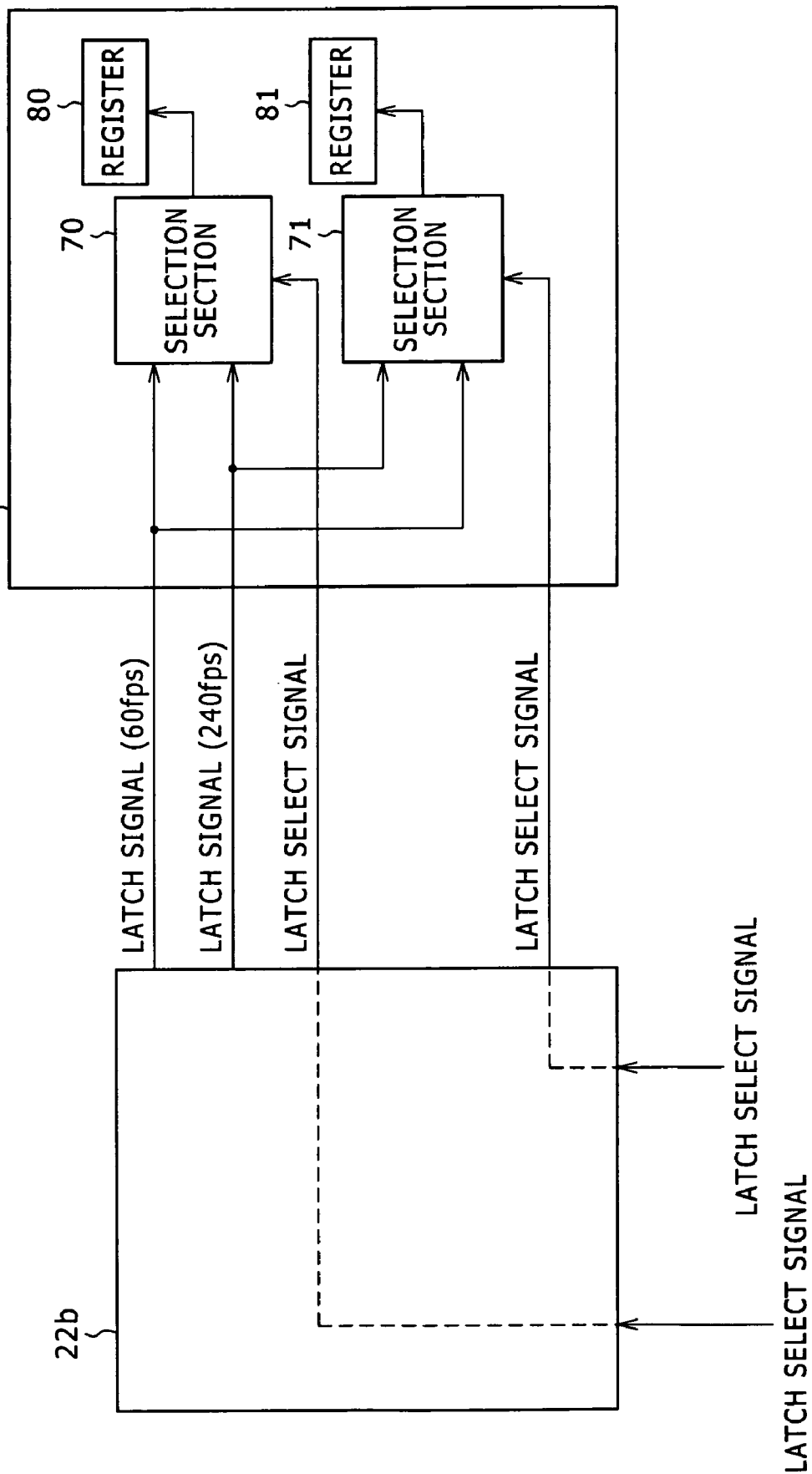

VARIABLE FRAME RATE IMAGING

CROSS-REFERENCE TO RELATED APPLICATION

The present application claims priority from Japanese Patent Application No. JP 2005-148949, filed in the Japanese Patent Office on May 23, 2005, the entire content of which is incorporated herein by reference.

BACKGROUND OF THE INVENTION

The present invention relates to an image processing apparatus for processing an image signal, an image capture apparatus including the image processing apparatus, and an image processing method, and more particularly to an image processing apparatus, an image capture apparatus, and an image processing method capable of processing image signals having a plurality of different picture rates.

In recent years, as a competition in the development of image capture apparatuses represented by digital still cameras becomes more severe, consumer image capture apparatuses are required to be higher and higher in image quality, circuit integration and function. Accordingly, special functions thus far restricted to professional use starts spreading among consumer apparatuses. A high-speed image capture function which performs image capture at a picture rate higher than a normal image capture rate is one representative example of the special functions. If the high-speed image capture function is to be realized, the speed of internal operation of such an image capture apparatus needs be increased.

There is a related art image capture apparatus which is constructed to realize high-speed image capture by using an external recording device, such as an external memory or a hard disk drive, connected to the apparatus (refer to, for example, Japanese Patent Application Publication Number hei9-186964 (Paragraph Numbers [0004] to [0005] and FIG. 1)). There is also a related art image capture apparatus which is constructed to increase the throughput per unit time of image data and realize high-speed image capture by adopting a circuit structure for processing data from a sensor in parallel (refer to, for example, Japanese Patent Application Publication Number hei8-251492 (Paragraph Numbers [0027] to [0036] and FIG. 1)).

SUMMARY OF THE INVENTION

However, if the speed of an internal operation is increased in order to realize a high-speed image capture function as in the case of the image capture apparatus disclosed in each of the above-cited patent documents, there is the problem that the manufacturing costs and the circuit scale as well as the power consumption of an operation circuit and the like increase.

The present invention has been made in view of the above-mentioned circumstances. According to an embodiment of the present invention, it is provided an inexpensive image processing apparatus capable of processing image signals having a plurality of different picture rates with low power consumption.

Furthermore, according to another embodiment of the present invention, it is provided an image capture apparatus capable of capturing an image at a plurality of different picture rates with low cost and low power consumption.

Still furthermore, according to another embodiment of the present invention, it is provided an image processing method capable of processing image signals having a plurality of different picture rates with low cost and low power consumption.

There is provided, therefore, an image processing apparatus for processing an image signal, which includes operation processing means, latch signal generation means, latch signal selection means, and latch signal selection indication means. The operation processing means performs an operation according to a detected value of the image signal. The latch signal generation means generates a plurality of latch signals, which indicate a timing of processing for the operation processing means and are based on a plurality of different picture rates applied to the image signal. The latch signal selection means selects one of the plurality of latch signals inputted from the latch signal generation means and outputs the selected latch signal to the operation processing means. The latch signal selection indication means indicates to the latch signal selection means a latch signal to be selected from the plurality of latch signals.

In the image processing apparatus, the latch signal generation means generates a plurality of latch signals based on a plurality of different picture rates applied to an image signal, and the latch signal selection means selects one of the plurality of latch signals according to an indication inputted from the latch signal generation means and outputs the selected latch signal to the operation processing means. Accordingly, during execution of an operation based on an image signal of higher picture rate, the operation processing means selects a latch signal based on a lower picture rate when necessary, and outputs an operation result on the basis of the latch signal.

The image processing apparatus according to an embodiment of the present invention, when the operation processing means is performing an operation on the basis of an image signal of higher picture rate, a latch signal based on a lower picture rate is selected if necessary and the operation processing means can perform an operate on the basis of the latch signal, so that the processing load imposed on the operation processing means can be reduced and the manufacturing costs and the power consumption of the apparatus can be reduced.

BRIEF DESCRIPTION OF THE DRAWINGS

The present invention will become more readily appreciated and understood from the following detailed description of embodiments and examples of the present invention when taken in conjunction with the accompanying drawings, in which:

FIG. 6 is a block diagram showing the function of a latch signal output section operative to effect switching between latch signals on a field-by-field basis;

FIG. 7 is a timing chart showing processing of a signal processing section according to a second embodiment of the present invention; and FIG. 8 is a block diagram showing a function of an AE operation processing section operative to effect switching between latch signals on a register-by-register basis.

DETAILED DESCRIPTION

Figure 1:
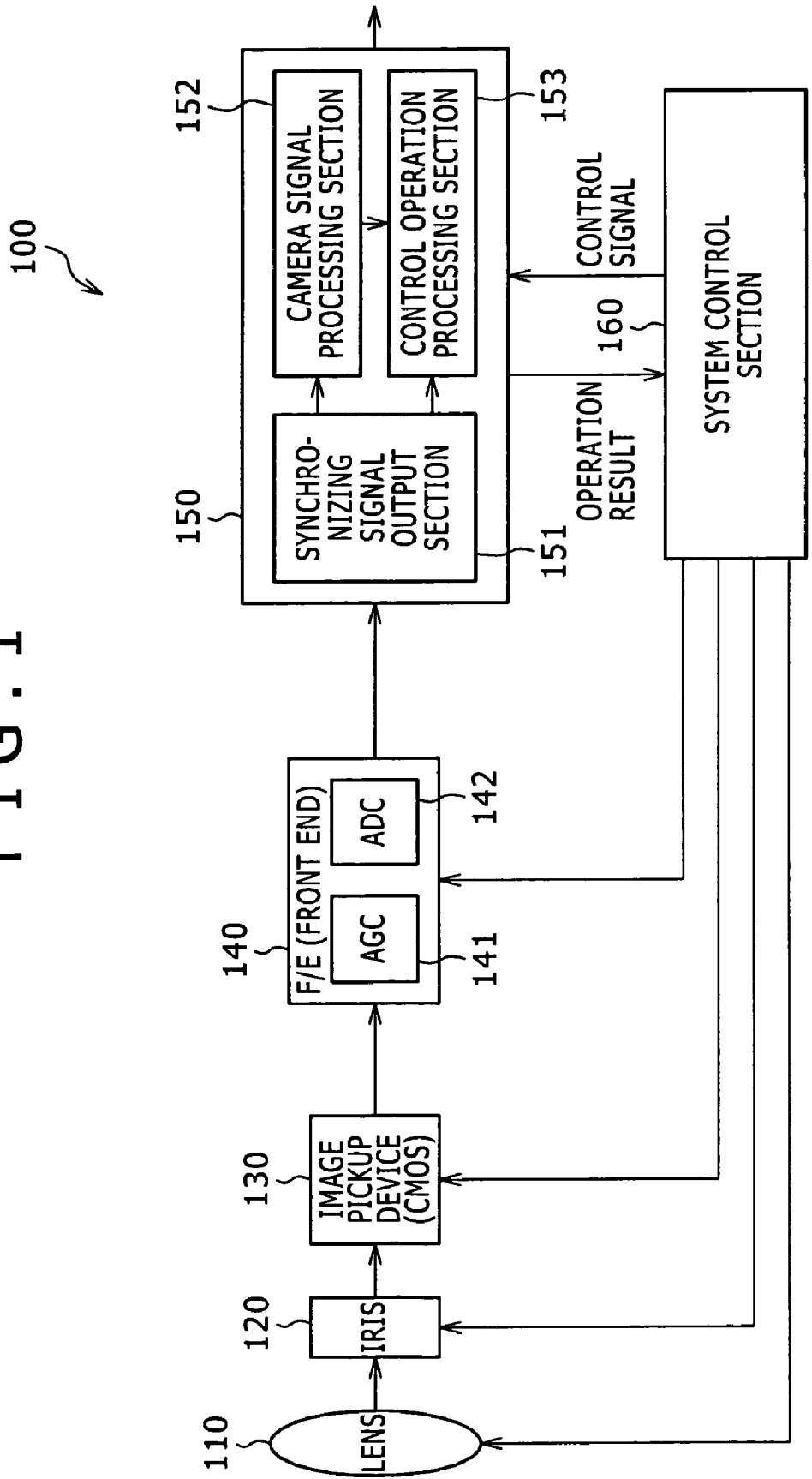
FIG. 1 is a block diagram showing a function of an image capture apparatus according to an embodiment of the present invention.

Embodiments of the present invention will be described below in detail with reference to the accompanying drawings. FIG. 1 is a block diagram showing the function of an image capture apparatus according to an embodiment of the present invention. As shown in FIG. 1, an image capture apparatus 100 includes a lens 110, an iris 120, an image pickup device 130, an F/E (Front End) 140, a signal processing section 150, and a system control section 160. The F/E 140 includes an AGC (Auto Gain Control) 141 and an ADC (Analog Digital Converter) 142. The signal processing section 150 also includes a synchronizing signal output section 151, a camera signal processing section 152, and a control operation processing section 153.

The lens 110 is provided for focusing light from a subject onto the image pickup device 130, and is made of a plurality of lens elements and performs focusing and zooming by moving their positions on the basis of control signals outputted from the system control section 160. The iris 120 is a device which adjusts the amount of light entering from the subject via the lens 110.

The image pickup device 130 is driven on the basis of control signals outputted from the system control section 160, and converts light entering from the subject into an electrical signal through photoelectric conversion. In this embodiment, a CMOS (Complementary Metal Oxide Semiconductor) type of image pickup device is used by way of example. The image pickup device 130 also includes a built-in sample-and-hold function for correctly maintaining its S/N (Signal/Noise) ratio through CDS (Correlated Double Sampling) processing.

The image pickup device 130 enables read-out of signals at a high speed not less than a rate of 60 fps (fields/second) which is defined by NTSC specifications. In this embodiment, it is assumed that when the image pickup device 130 is switched to a high-speed mode which enables read-out of signals at a high speed, the image pickup device 130 outputs readout signals at 240 fps of four times the standard rate.

The image pickup device 130 is provided with the function of reducing, during the outputting of, for example, pixel signals for one line, an image size without changing the angle of field by adding the signals of adjacent same color pixels to the pixel signals and outputting the pixel signals for one line and the signals of the adjacent same color pixels at the same time. Such pixel addition makes it possible to increase a picture switching rate without increasing the readout frequency of pixel signals. In addition, the image pickup device 130 may also be adapted to be able to output readout signals at an arbitrary picture rate by adjusting the number of pixels to be added. In addition, the image pickup device 130 may also use another MOS type or a CCD (Charge Coupled Device) type of image pickup device. If the image pickup device 130 is a CCD type of image pickup device, the CDS processing function may also be provided in the F/E 140.

The F/E 140 controls the gain of an image signal outputted from the image pickup device 130 through processing in the AGC 141 and performs A/D (Analog/Digital) conversion of the image signal through processing in the ADC 142, thereby outputting a digital image signal.

The signal processing section 150 is a block which applies various kinds of camera signal processing to RGB (Red, Green, Blue) signals outputted from the F/E 140 and outputs a luminance (Y) signal and color-difference (C) signals, and is realized as, for example, one semiconductor integrated circuit. The signal processing section 150 includes the synchronizing signal output section 151, the camera signal processing section 152 and the control operation processing section 153.

The synchronizing signal output section 151 outputs various signals for synchronizing processing timing for signal transmission and reception and the like among the camera signal processing section 152, the control operation processing section 153 and the system control section 160. As will be mentioned later, for example, the control operation processing section 153 controls the reception timing of control signals from the system control section 160, the output timing of operation results obtained by the control operation processing section 153, and the like, in accordance with latch signals outputted from the synchronizing signal output section 151.

The camera signal processing section 152 is a block which performs processing and the like of RGB signals outputted from the F/E 140, and includes, for example, a WB (White Balance) amplifier, a digital clamp section, and a pixel signal substitution section for pixel defect correction. The control operation processing section 153 performs the operations necessary for camera signal processing such as WB adjustment processing, color correction processing, AF (Auto Focus) processing and AE (Auto Exposure) processing on the basis of a detected value of an image signal from the F/E 140 and signals from the system control section 160.

The system control section 160 is a block which generally controls the entire image capture apparatus 100, and is realized as a microcontroller including, for example, a CPU. During camera signal processing, the system control section 160 requests the information necessary for control from the signal processing section 150 in accordance with horizontal and vertical synchronizing signals, performs operation using values received in response to the request, and outputs control signals to each section in the image capture apparatus 100. For example, the system control section 160 controls the position of the lens 110 according to the result of an AF operation, and also controls the opening degree and the shutter speed of the iris 120 as well as the electronic shutter speed of the image pickup device 130 according to the result of an AE operation. In addition, the system control section 160 outputs a gain control signal for the AGC 141 to the F/E 140 and a WB gain control signal and the like to the signal processing section 150.

Figure 2:
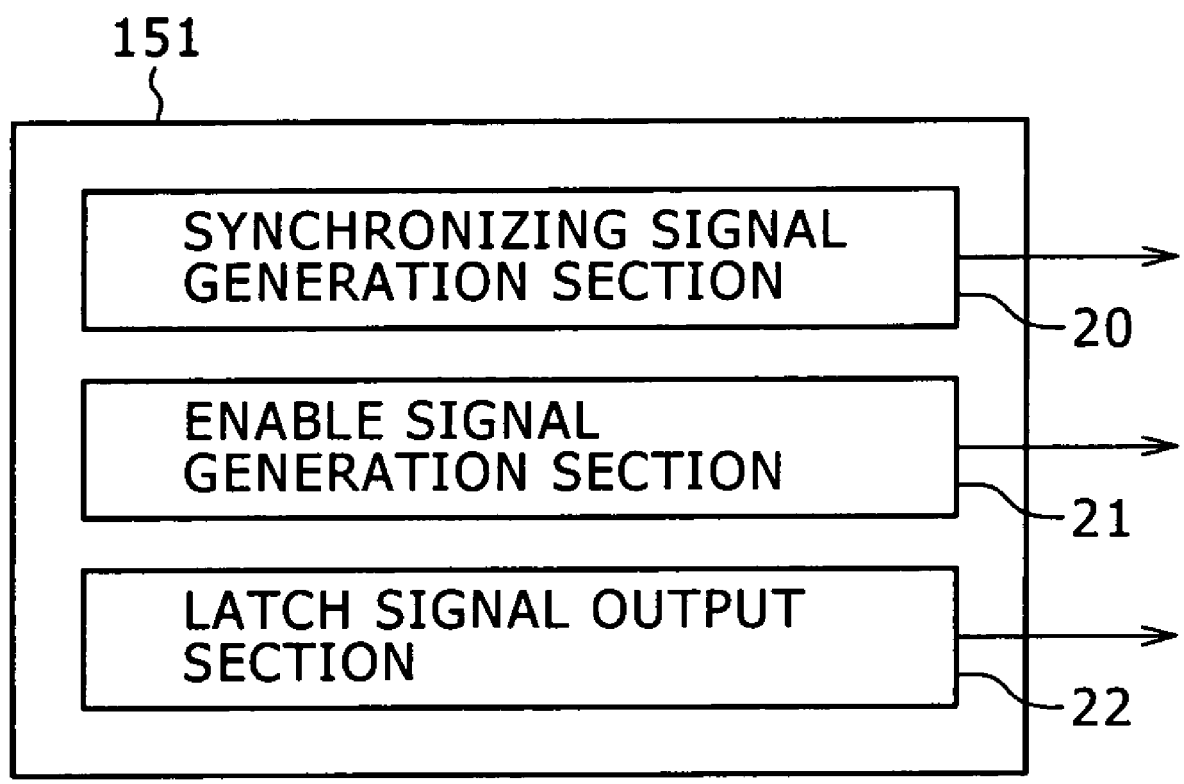
FIG. 2 is a block diagram showing a function of a synchronizing signal output section.

FIG. 2 is a block diagram showing the function of the synchronizing signal output section 151. As shown in FIG. 2, the synchronizing signal output section 151 includes a synchronizing signal generation section 20, an enable signal generation section 21, and a latch signal output section 22. The synchronizing signal generation section 20 generates various timing signals such as horizontal synchronizing signals and vertical synchronizing signals for the camera signal processing section 152 and the control operation processing section 153. The enable signal generation section 21 generates an enable signal indicative of whether each signal inputted from the image pickup device 130 is enabled or disabled, and outputs the enable signal to the camera signal processing section 152 and the control operation processing section 153. The latch signal output section 22 outputs latch signals for latching control signals from the system control section 160, an operation result obtained by the signal processing section 150, and the like.

Figure 3:
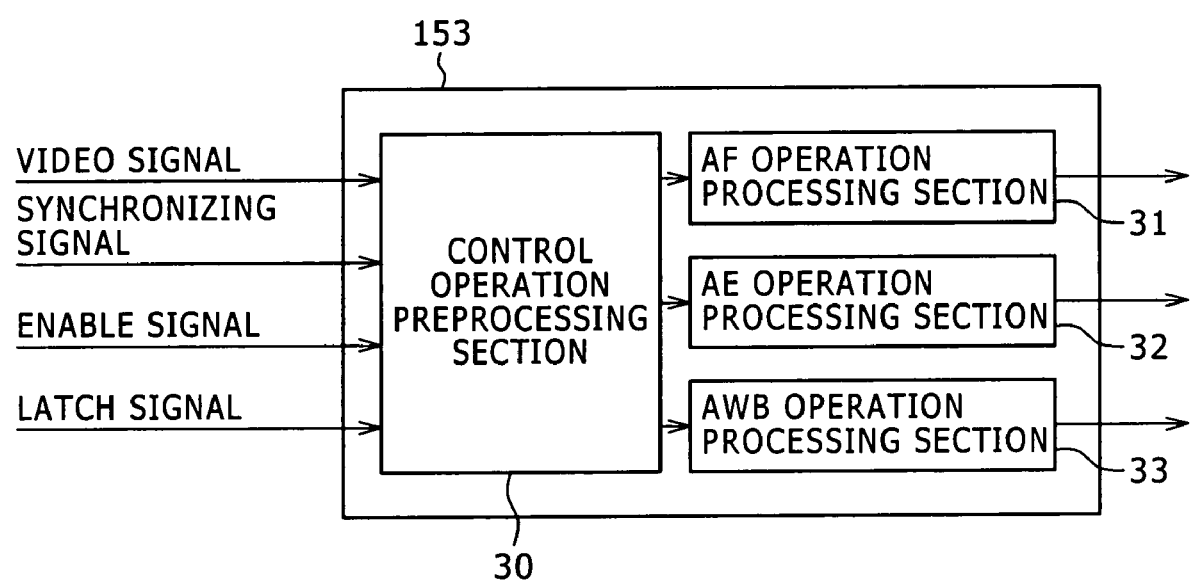
FIG. 3 is a block diagram showing a function of a control operation processing section.

FIG. 3 is a block diagram showing the function of the control operation processing section 153. As shown in FIG. 3, the control operation processing section 153 includes a control operation preprocessing section 30, an AF operation processing section 31, an AE operation processing section 32, and an AWB operation processing section 33, and individual blocks, i.e., the AF operation processing section 31, the AE operation processing section 32 and the AWB operation processing section 33, are connected in parallel to the control operation preprocessing section 30.

The control operation preprocessing section 30 performs, on the basis of synchronizing signals and an enable signal from the synchronizing signal output section 151, control of input of a video signal into the subsequent stage, i.e., the AF operation processing section 31, the AE operation processing section 32 and the AWB operation processing section 33, counting of addresses in the horizontal and vertical directions, generation of a timing signal indicative of whether a target area to be controlled is enabled or disabled, and the like. The control operation preprocessing section 30 also output latch signals from the synchronizing signal output section 151 to the respective sections 31, 32 and 33 provided at the subsequent stage. As will be mentioned later, if a plurality of latch signals are inputted to the control operation processing section 153, these latch signals are respectively supplied to the predetermined operation processing sections via the control operation preprocessing section 30.

The AF operation processing section 31 performs various kinds of operation processing for AF processing (automatic distance measurement processing) to automatically drive and control the lens 110 according to the distance to the subject. The AE operation processing section 32 performs various kinds of operation processing for AE processing (automatic light measurement processing) to automatically determine exposure conditions by calculating a shutter speed and an aperture value according to the illumination of the subject. The AWB operation processing section 33 performs various kinds of operation processing for AWB processing (automatic colormetry processing) to measure the color temperature of the subject or a light source and determine gains for the respective colors (R, G and B), thereby automatically performing optimum color reproduction processing.

Each of the AF operation processing section 31, the AE operation processing section 32 and the AWB operation processing section 33 performs such various kinds of operation processing on the basis of control signals from the system control section 160, and outputs an operation result to the system control section 160 if required. During this time, the latch timing of the operation result in each of the operation processing sections and the reception timing of the control signals from the system control section 160 are controlled by latch signals outputted from the synchronizing signal generation section 20.

The embodiments of the present invention will be specifically described below.

First Embodiment

Figure 4:
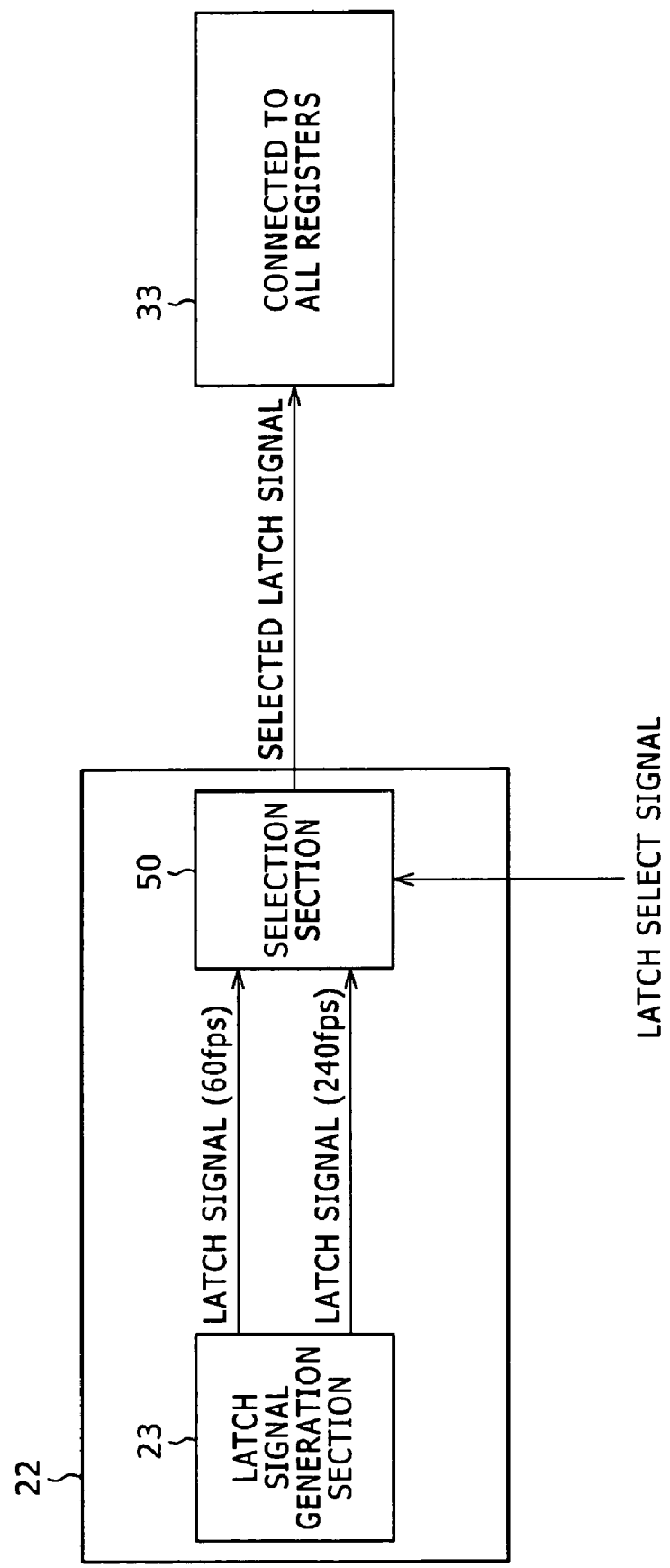
FIG. 4 is a block diagram showing a function of a latch signal output section operative to effect switching between latch signals on a block-by-block basis.

FIG. 4 is a block diagram showing the function of the latch signal output section 22 operative to effect switching between latch signals on a block-by-block basis (in this embodiment, for each of the operation processing units shown in FIG. 3). In the description of the first embodiment, by way of example, reference will be made to the latch signal output section 22 which supplies a latch signal to the AWB operation processing section 33.

As shown in FIG. 4, the latch signal output section 22 includes a latch signal generation section 23 and a selection section 50. The latch signal generation section 23 generates two kinds of latch signals, which are a latch signal of normal image capture rate (60 fps) and a latch signal of high image capture rate (240 fps), on the basis of vertical synchronizing signals at the respective picture rates.

The selection section 50 selects one latch signal from the two latch signals received from the latch signal generation section 23, on the basis of a latch select signal from the system control section 160, and outputs the selected latch signal to, for example, the AWB operation processing section 33. The AWB operation processing section 33 executes latching of a control signal outputted from the system control section 160 and the result of an operation by the AWB operation processing section 33 on the basis of the latch signal outputted from the selection section 50. More specifically, if the latch signal of high image capture rate is selected, the AWB operation processing section 33 performs latching at the high image capture rate, whereas if the latch signal of normal image capture rate is selected, the AWB operation processing section 33 performs latching at the normal image capture rate.

The AWB operation processing section 33 partly performs, for example, measurement of the color temperature of a subject or a light source and calculations of gains for the respective colors. If the light source and the color temperature of a subject being captured greatly vary during high-speed image capture, the selection section 50 selects the latch signal of 240 fps so that the AWB operation processing section 33 is controlled at the high image capture rate. Conversely, if the light source and the color temperature of a subject being captured do not greatly vary even during high-speed image capture, in order to reduce control loads on the system control section 160 and the amount of data communicated by the same, the selection section 50 selects the latch signal of 60 fps so that the AWB operation processing section 33 is not controlled at the high image capture rate.

Otherwise, the latch signal output section 22 may also be adapted to effect switching between the latch signals according to image-taking scenes as well as in response to user's operation inputs. For example, when an image is to be taken with the image capture apparatus 100 being fixed, the latch signal output section 22 selects the latch signal of 60 fps because a large variation does not occur in the picture, whereas when an image is to be taken while the image capture apparatus 100 is being moved or when an image of a moving subject is to be taken, the latch signal output section 22 selects the signal of 240 fps, so that the image capture apparatus 100 can obtain a video image of far higher image quality.

In this manner, the latch signal output section 22 performs control while effecting switching between the latch signals with respect to one block corresponding to the entire AWB operation processing section 33. The latch signal output section 22 may also be constructed so that the selection section 50 effects switching not only between latch signals for the AWB operation processing section 33 but also between latch signals for the AF operation processing section 31 and between latch signals for the AE operation processing section 32. In addition, the latch signal output section 22 may also be constructed so that only a latch signal of certain constant rate flows from the latch signal generation section 23 to each of the blocks other than the AWB operation processing section 33 without passing through the selection section 50. In addition, the latch signal output section 22 may also be provided with a plurality of selection sections to each of which two latch signals are to be inputted in parallel from the latch signal generation section 23, so that a latch select signal can be outputted to each of the selection sections to select either one of the latch signals.

Figure 5:
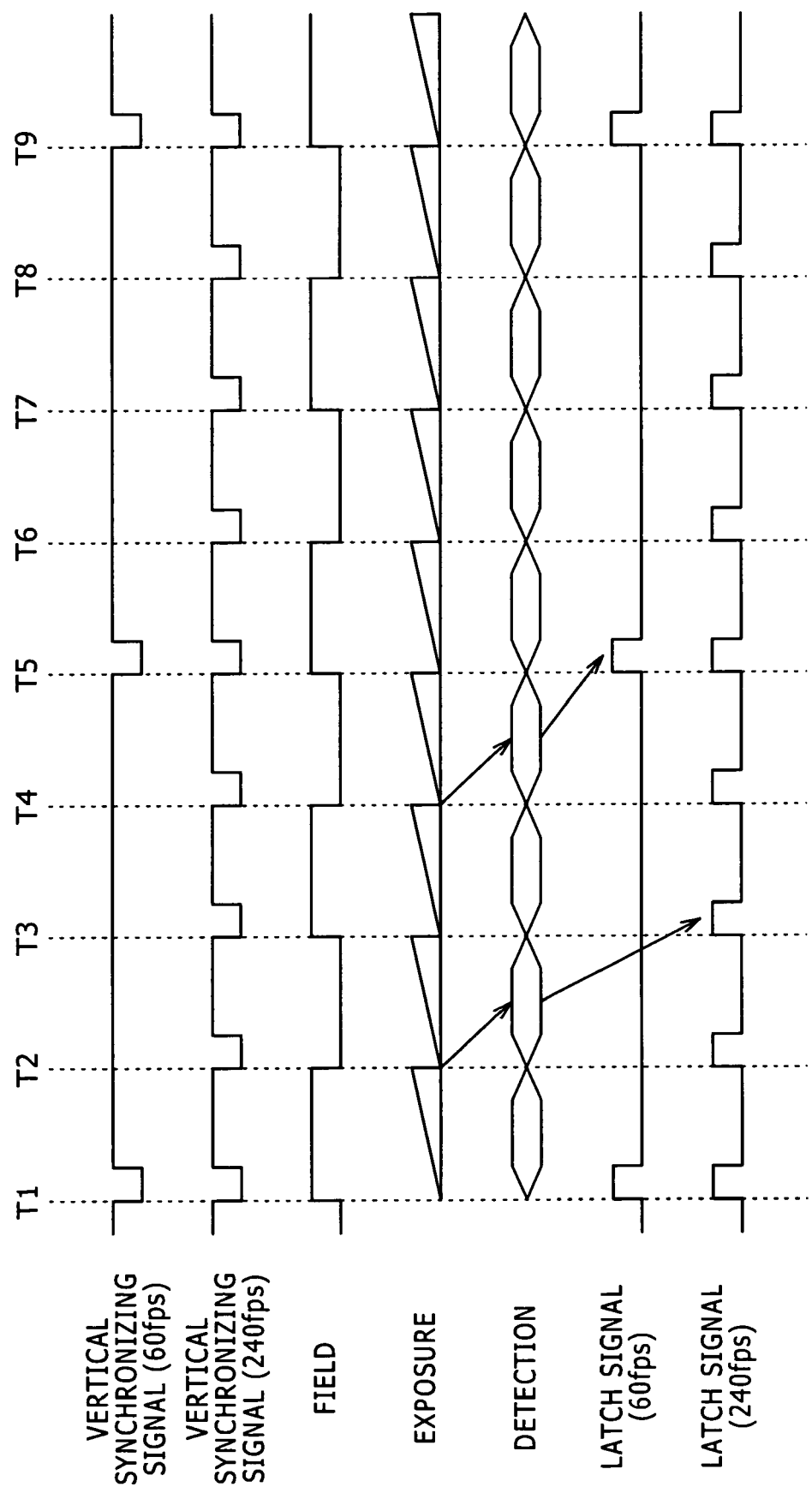
FIG. 5 is a timing chart showing the processing of a signal processing section according to a first embodiment of the present invention.

The manner of selection between the above-mentioned latch signals is shown in the timing chart of FIG. 5.

FIG. 5 is a timing chart showing the processing of the signal processing section 150 according to the first embodiment. As shown in FIG. 5 by way of example, it is assumed that vertical synchronizing timings of normal image capture rate (60 fps) respectively appear at times T1, T5 and T9, and vertical synchronizing timings of high image capture rate (240 fps) respectively appear at times T1 to T9.

During high-speed image capture, fields are switched in synchronism with synchronizing signals of high image capture rate. For example, detection (for example, integration) of an image signal by the AWB operation processing section 33 is also performed field-by-field in synchronism with the synchronizing signals of high image capture rate. At this time, when the latch signal of high image capture rate is selected by the selection section 50 and is outputted to the AWB operation processing section 33, a detected value of the image signal is latched in synchronism with the latch signal of high image capture rate and is loaded into the system control section 160, and the system control section 160 performs a control value operation on the gain of the WB amplifier. For example, an image signal obtained by exposure between the time T1 and the time T2 is detected by the AWB operation processing section 33 at the time T2 and the detected value is latched at the time T3, and an operation is executed on the gain of the WB amplifier on the basis of the detected value between the time T3 and the time T4 by the system control section 160. Subsequently, at every time, an image signal is sequentially detected and latched and the gain of the WB amplifier is calculated.

On the other hand, during high-speed image capture, when the latch signal of normal image capture rate is selected by the selection section 50 and is outputted to the AWB operation processing section 33, detection of an image signal is performed at each vertical synchronizing timing of 240 fps by the AWB operation processing section 33, but latching of the detected values is performed in synchronism with the latch signal of 60 fps at the times T1, T5 and T9 as shown in FIG. 5. For example, an operation is performed on the gain of the WB amplifier between the time T5 and the time T6 on the basis of the detected value latched at the time T5, by the system control section 160.

More specifically, if the latch signal of normal image capture rate is selected during high-speed image capture, the amount of data transferred to the system control section 160 is reduced to ¼ and the operation load imposed on the system control section 160 is also reduced to ¼, as compared to when the latch signal of high image capture rate is selected. In the above-mentioned process, the latch timing of the values calculated by the AWB operation processing section 33 is controlled, but the latch timing of a control signal from the system control section 160 in the AWB operation processing section 33 may be controlled by the latch signal of normal image capture rate and the AWB operation processing section 33 may start an operation in accordance with the control signal. In this case, the operation load imposed on the AWB operation processing section 33 is also reduced.

As mentioned above, the image processing apparatus according to the first embodiment is constructed to be able to select a latch signal having the minimum rate necessary for processing to be performed by one of blocks, from a plurality of latch signals on a block-by-block basis, so that when the system control section 160 does not need an operation result from the AWB operation processing section 33 at the high image capture rate during high-speed image capture, the latch signal of normal image capture rate can be selected and switched to reduce the load of control processing and the amount of communication data during control processing. Accordingly, the first embodiment makes it possible to generate a subject video signal adjusted in color tone even during high-speed image capture with reduced manufacturing costs and power consumption.

Second Embodiment

The second embodiment of the present invention will be described below. An image processing apparatus according to the second embodiment has a construction similar to that used in the first embodiment, except that latch signals are switched field-by-field. In the following, identical reference numerals are used to denote constituent sections approximately the same as the corresponding ones used in the first embodiment, and the description thereof will be appropriately omitted.

FIG. 6 is a block diagram showing the function of a latch signal output section operative to effect switching between latch signals on a field-by-field basis. In the description of the second embodiment, by way of example, reference will be made to a latch signal output section 22a which supplies a latch signal to the AF operation processing section 31. As shown in FIG. 6, the latch signal output section 22a includes a latch signal generation section 23, a selection section 60, and a logical operation section 61.

Similarly to the latch signal generation section 23 in the first embodiment, the latch signal output section 23 generates two kinds of latch signals, which are a latch signal of normal image capture rate (60 fps) and a latch signal of high image capture rate (240 fps).

The logical operation section 61 performs an AND operation on a field counter signal inputted during high-speed image capture and a field select signal which is arbitrarily set, and only when both signals coincide with each other, the logical operation section 61 outputs a latch signal received from the latch signal generation section 23. Otherwise, the logical operation section 61 masks the latch signal (in the second embodiment, the latch signal is fixed to an L level). The field counter signal is a signal which is counted in synchronism with vertical synchronizing signals by, for example, the system control section 160. In the second embodiment, since the high image capture rate is four times the normal image capture rate, the system control section 160 repeatedly counts from 0 to 3. The field select signal is any of signals of 0 to 3 which are designated by the system control section 160. On the basis of a combination of the count cycle of the field counter signal and the designation of at least one of the field select signals, the latch signal output section 22a can generate various field selection rules and output latch timings during arbitrary fields.

The selection section 60 selects one latch signal from the latch signal received from the logical operation section 61 and the latch signal of normal image capture rate, on the basis of a latch select signal from the system control section 160, and outputs the selected latch signal to the AF operation processing section 31.

The AF operation processing section 31 executes latching of a control signal outputted from the system control section 160 and the result of an operation by the AF operation processing section 31 on the basis of the latch signal outputted from the selection section 60. More specifically, if the latch signal from the logical operation section 61 is selected, the AF operation processing section 31 performs latching for an arbitrary field, whereas if the latch signal of normal image capture rate is selected, the AF operation processing section 31 performs latching at the normal image capture rate on a block-by-block basis.

In general, when an image signal is to be processed in the signal processing section 150, the image signal first of all needs to be in focus, so that the system control section 160 needs to perform control processing on the AF operation processing section 31 prior to control on the other blocks. The latch signal output section 22a, if necessary, can change a target field to be controlled with the latch signal outputted to the AF operation processing section 31, so that the AF operation processing section 31 can be made to perform focusing control prior to control on the other blocks during high-speed image capture. Particularly when a subject is making an active movement during high-speed image capture, the AF operation processing section 31 can be made to perform focusing prior to control on the other blocks so as to improve image quality to a further extent.

For example, the system control section 160 calculates the difference between distance measurement results for AF as to mutually adjacent frames or fields, and if such difference is less than a predetermined value, the system control section 160 causes the selection section 60 to select the latch signal of 60 fps. If such difference is not less than the predetermined value, the system control section 160 causes the selection section 60 to execute focusing prior to control on the other blocks such as the AWB operation processing section 33.

In addition, the latch signal output section 22a may be constructed to effect switching between the latch signals in response to user's operation inputs as well as according to image-taking scenes, for example, according to whether an image is to be taken with the image capture apparatus 100 being fixed or moved, or according to the presence or absence of a movement of a subject.

The manner of selection between the above-mentioned latch signals is shown in the timing chart of FIG. 7. FIG. 7 is a timing chart showing the processing of the signal processing section 150 according to the second embodiment. As shown in FIG. 7 by way of example, it is assumed that the field select signal is set to "1" and the latch signal outputted from the logical operation section 61 is selected for the AF operation processing section 31, while the latch signal of 60 fps is supplied to the AWB operation processing section 33.

During high-speed image capture, detection for distance measurement by the AF operation processing section 31 and detection for color temperature measurement by the AWB operation processing section 33 are executed field-by-field at times T11 to T19. In this case, when the latch signal from the logical operation section 61 is selected, the latch signal from the logical operation section 61 is outputted at a vertical synchronizing timing following the output timing of the latch signal of 60 fps.

For example, at the time T15, detection is performed by the AF operation processing section 31 on the basis of an image signal obtained by exposure between the time T14 and the time T15, and the detection result is latched at the time T16, and the system control section 160 executes AF control by using the latched detection result. During an in-focus state due to the AF control, exposure is performed between the time T17 and the time T18, and an image signal obtained by the exposure is detected at the time T18 by the AWB operation processing section 33. Then, the detection result is latched at the time T19, and a control value of the WB gain is calculated by the system control section 160.

As mentioned above, in the second embodiment, the latch signal of 240 fps is decimated and supplied to the AF operation processing section 31, so that the amount of data transferred to the system control section 160 is reduced to ¼ and the operation load imposed on the system control section 160 is also reduced to ¼, as compared to when the latch signal of high image capture rate is selected. In addition, the latch signal output section 22a can decimate and output the latch signal in synchronism with an arbitrary field, so that, during high-speed image capture, the system control section 160 can obtain an operation result (evaluated value) from the AF operation processing section 31 as to the arbitrary field. Accordingly, the second embodiment makes it possible to generate an appropriate subject video signal with reduced operation loads and reduced power consumption as well as reduced manufacturing costs.

In the above description of the first and second embodiments, reference has been made to the example in which the latch signals are switched therebetween during image capture when necessary. However, for example, during a development phase, the above-mentioned latch signal switching functions may be provided in a shared manner in each of the signal processing sections 150 according to the first and second embodiments so that after a predetermined one of the latch signals is selected according to changes in the specifications of each of the operation processing sections of the control operation processing section 153 provided in the subsequent stage, the selected state is fixed. For example, a selection section may be set so that a latch signal for a high image capture rate is supplied to only a block which requires processing at the high image capture rate, while a latch signal of low image capture rate is supplied to the other blocks which do not require such processing. Accordingly, the circuit construction of the signal processing section 150 can be given versatility, so that development costs can be reduced.

Third Embodiment

The third embodiment of the present invention will be described below. An image processing apparatus according to the third embodiment has a construction similar to that used in the first embodiment, except that latch signals are switched on a register basis or register group basis in the signal processing section 150. In the following, identical reference numerals are used to denote constituent sections approximately the same as the corresponding ones used in the first embodiment, and the description thereof will be appropriately omitted.

FIG. 8 is a block diagram showing the function of an AE operation processing section operative to effect switching between latch signals for each register. In the description of the third embodiment, by way of example, reference will be made to the case in which latch signals are switched register-by-register in the AE operation processing section 32b. As shown in FIG. 8, the latch signal output section 22b outputs a latch signal of high image capture rate (240 fps) and a latch signal of normal image capture rate (60 fps) to the AE operation processing section 32b. In addition, two select signals from the system control section 160 are outputted to the AE operation processing section 32b via the latch signal output section 22b. The AE operation processing section 32b includes selection sections 70 and 71 and registers 80 and 81.

Each of the selection sections 70 and 71 receives the two kinds of latch signals from the latch signal output section 22 as well as one latch select signal. Each of the selection sections 70 and 71 selects either one of the latch signals on the basis of the received one latch select signal and outputs the selected latch signal to the corresponding one of the registers 80 and 81.

The registers 80 and 81 temporarily hold control signals and the like outputted from the system control section 160 and operation results obtained in the AE operation processing section 32b. During high-speed image capture, a latch signal to control the latch timing of data stored in each of the registers 80 and 81 can be individually selected by the respective one of the selection sections 70 and 71. In addition, the AE operation processing section 32b may also be constructed so that a latch signal from each of the selection sections 70 and 71 is supplied to a plurality of registers.

For example, the AE operation processing section 32b calculates a shutter speed and an aperture value according to the illumination of a subject. There is a case where if brightness greatly varies, the necessary processing rate varies according to the internal operation results of the AE operation processing section 32b. More specifically, during high-speed image capture, a register (or a register group) controlled at the high image capture rate and a register (or a register group) controlled at the normal image capture rate for fixed fields coexist in the AE operation processing section 32b. Conversely, if brightness does not greatly vary, the registers (or the register groups) may be controlled at only the normal image capture rate for fixed fields.

The system control section 160 becomes able to obtain from an arbitrary register an operation result (an evaluated value) calculated by the AE operation processing section 32b, so that the image processing apparatus can constantly generate exposure-adjusted subject video signals during high-speed image capture.

As mentioned above, the image processing apparatus according to the third embodiment is constructed to be able to select one of a plurality of latch signals on a register basis, so that the AE operation processing section 32b can select a latch signal having the necessary minimum rate by switching latching on a register basis, and can constantly generate suitable subject video signals even during high-speed image capture. In addition, the control load imposed on the system control section 160 and the amount of data communicated by the same can be reduced, and reductions in cost and power consumption of the apparatus can be realized.

In accordance with the image capture apparatus according to each of the first to third embodiments, the latch signals outputted from the latch signal output section in the synchronizing signal output section 151 to the camera signal processing section 152 and the control operation processing section 153 are switched therebetween by any one of three switching methods, i.e., block-by-block, field-by-field and register-by-register, according to image capture rates. Accordingly, the processing load imposed on and the amount of data communicated by the system control section 160 and the signal processing section 150 during high-speed image capture are reduced, so that reductions in cost and power consumption of the apparatus can be realized.

The above descriptions of the first to third embodiments have respectively referred to the construction examples of the AWB operation processing section, the AF operation processing section and the AE operation processing section. However, each of the above-mentioned switching methods can be applied to any of the above-mentioned operation processing sections, and in this case as well, it is possible to obtain advantages similar to those of the first to third embodiments. In addition, the three switching methods, i.e., block-by-block, field-by-field and register-by-register, can also be used in combination. In addition, in each of the first to third embodiments, the high image capture rate is set to 240 fps and the normal image capture rate is set to 60 fps, but both the image capture rates may also be set to other image capture rates.

In each of the first to third embodiments, during the high-speed mode, since the resolution of an image signal from the image pickup device 130 is lower than during the standard-rate mode, the signal processing section 150 can process the image signal without increasing the operating frequency. However, if high-speed image capture is realized by increasing the output signal frequency of the image pickup device 130, it is possible to reduce the internal operating frequency of the signal processing section 150 by supplying a latch signal based on a far lower picture rate to the signal processing section 150 when needed, so that the effect of reducing manufacturing costs and power consumption can be increased to a further extent.

In the above description of any of the first to third embodiments, reference has been made to the example in which the signal processing section 150 is constructed with an integrated circuit (hardware). However, the whole or part of this block may be realized on a software basis by using a computer or the like, and in this case as well, it is possible to obtain advantages similar to those of the first to third embodiments. In addition, the present invention can be applied not only to an apparatus having an image capture function but also to an apparatus which performs various image processing in response to an input of a captured image signal. In this case as well, the whole or part of the function may be realized on a software basis.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus for processing an image signal, comprising:
   operation processing means for performing an operation according to a detected value of the image signal;
   latch signal generation means for generating a plurality of latch signals, which indicate a timing of processing for the operation processing means and are based on a plurality of different picture rates applied to the image signal;
   latch signal selection means for selecting one of the plurality of latch signals inputted from the latch signal generation means and outputting the selected latch signal to the operation processing means; and
   latch signal selection indication means for indicating to the latch signal selection means a latch signal to be selected from the plurality of latch signals,
   selection of a latch signal is based, at least, on a result of automatic colorimetry processing.

2. The image processing apparatus according to claim 1, wherein the latch signal generation means outputs to the latch signal selection means a first latch signal generated on the basis of a synchronizing signal of an image corresponding to a first picture rate and a second latch signal generated on the basis of a synchronizing signal of an image corresponding to a second picture rate higher than the first picture rate.

3. The image processing apparatus according to claim 2, further comprising output control means for decimating the second latch signal in accordance with a predetermine rule and outputting the decimated second latch signal to the latch signal selection means if the image signal has the second picture rate.

4. The image processing apparatus according to claim 1, wherein the latch signal selection means is individually provided for each register or register group provided in the operation processing means.

5. The image processing apparatus according to claim 1, wherein the operation processing means is provided in plural number and the latch signal is outputted from the latch signal selection means to at least one of the plural operation processing means.

6. The image processing apparatus according to claim 1, wherein the operation processing means is provided in plural number and the latch signal selection means is provided in each of the plural operation processing means, and a latch signal is outputted from each of the latch signal selection means to a corresponding one of the plural operation processing means.

7. The image processing apparatus according to claim 1, wherein the latch signal is a signal indicative of at least one of latch timing of an operation result obtained by the operation processing means and latch timing of a control signal inputted to the operation processing means to control operation processing of the operation processing means.

8. An image capture apparatus for capturing an image, comprising:
   a solid-state image pickup device for capturing an image at a plurality of different picture rates;
   operation processing means for performing an operation according to a detected value of an image signal obtained by image capture;
   latch signal generation means for generating a plurality of latch signals, which indicate a timing of processing for the operation processing means and are based on the plurality of different picture rates;
   latch signal selection means for selecting, according to a selection indication, one of the plurality of latch signals inputted from the latch signal generation means and outputting the selected latch signal to the operation processing means; and
   latch signal selection means for indicating to the latch signal selection means a latch signal to be selected from the plurality of latch signals,
   selection of a latch signal is based, at least, a result of automatic colorimetry processing.

9. An image processing method of processing an image signal, comprising the steps of:
   generating, by latch signal generation means, a plurality of latch signals, which indicate a timing of processing for operation processing means and are based on a plurality of different picture rates;
   outputting, by latch signal selection means, to the operation processing means by selecting, according to a selection indication, one of the plurality of latch signals inputted from the latch signal generation means and output the selected latch signal; and
   performing, by the operation processing means, an operation according to a detected value of an image signal on the basis of the selected latch signal,
   selection of a latch signal is based, at least, a result of automatic colorimetry processing.

10. An image processing apparatus for processing an image signal, comprising:
    an operation processing section performing an operation according to a detected value of the image signal;
    a latch signal generation section for generating a plurality of latch signals, which indicate a timing of processing for the operation processing section and are based on a plurality of different picture rates applied to the image signal;
    a latch signal selection section selecting one of the plurality of latch signals inputted from the latch signal generation section and outputting the selected latch signal to the operation processing section; and
    a latch signal selection indication section indicating to the latch signal selection section a latch signal to be selected from the plurality of latch signals,
    selection of a latch signal is based, at least, on a result of automatic colorimetry processing.

* * * * *